United States Patent
Nakano et al.

(10) Patent No.: US 10,818,174 B2
(45) Date of Patent: Oct. 27, 2020

(54) OUTPUT APPARATUS

(71) Applicant: HONDA MOTOR CO., LTD., Tokyo (JP)

(72) Inventors: Kenichi Nakano, Saitama (JP);
Yoshiaki Tsukada, Saitama (JP);
Hiroyuki Kojima, Saitama (JP);
Takashi Ozeki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/368,896

(22) Filed: Mar. 29, 2019

(65) Prior Publication Data
US 2019/0304300 A1    Oct. 3, 2019

(30) Foreign Application Priority Data

Mar. 29, 2018 (JP) .................... 2018-064534

(51) Int. Cl.
| | |
|---|---|
| *G08G 1/0965* | (2006.01) |
| *G06F 3/01* | (2006.01) |
| *G06F 3/14* | (2006.01) |
| *G08G 1/16* | (2006.01) |
| *A42B 3/04* | (2006.01) |
| *A42B 3/30* | (2006.01) |
| *B62J 99/00* | (2020.01) |

(Continued)

(52) U.S. Cl.
CPC ......... *G08G 1/0965* (2013.01); *A42B 3/0433* (2013.01); *A42B 3/30* (2013.01); *B62J 99/00* (2013.01); *G06F 3/012* (2013.01); *G06F 3/14* (2013.01); *G08G 1/166* (2013.01); *B62J 50/20* (2020.02); *H04W 4/029* (2018.02); *H04W 4/46* (2018.02)

(58) Field of Classification Search
CPC .................................................. G08G 1/0965
See application file for complete search history.

(56) References Cited

U.S. PATENT DOCUMENTS

| | | | |
|---|---|---|---|
| 10,068,481 | B2 | 9/2018 | Sugimoto |
| 10,109,199 | B2 | 10/2018 | Shimizu |

(Continued)

FOREIGN PATENT DOCUMENTS

| | | |
|---|---|---|
| JP | H05146408 A | 6/1993 |
| JP | 2002342887 A | 11/2002 |

(Continued)

OTHER PUBLICATIONS

Office Action issued for counterpart Japanese Application No. 2018-064534, drafted by the Japan Patent Office dated Sep. 11, 2019.

(Continued)

*Primary Examiner* — Qutbuddin Ghulamali (57) ABSTRACT

An output apparatus includes: an identifying unit that identifies a direction in which an occupant of a first vehicle is looking; a receiving unit that receives, from a second vehicle positioned in the direction identified by the identifying unit, information indicating whether or not the first vehicle is recognized by the second vehicle; and an output unit that outputs alert information to at least one alerting device among alerting devices attached to the first vehicle and the occupant of the first vehicle if the first vehicle is not recognized by the second vehicle.

11 Claims, 7 Drawing Sheets

(51) Int. Cl.
  *H04W 4/029*     (2018.01)
  *H04W 4/46*      (2018.01)
  *B62J 50/20*     (2020.01)

(56) References Cited

U.S. PATENT DOCUMENTS

| 2003/0225511 | A1 | 12/2003 | Kushida |
| 2017/0076605 | A1 | 3/2017 | Suzuki |
| 2018/0056784 | A1* | 3/2018 | Virgilio .................. G07C 5/085 |
| 2018/0370530 | A1* | 12/2018 | Ishikawa .......... G08G 1/096791 |
| 2020/0053526 | A1 | 2/2020 | Ujiie |

FOREIGN PATENT DOCUMENTS

| JP | 2005165422 A | 6/2005 |
| JP | 2006065667 A | 3/2006 |
| JP | 2006268475 A | 10/2006 |
| JP | 2009134704 A | 6/2009 |
| JP | 2009192448 A | 8/2009 |
| JP | 2010191630 A | 9/2010 |
| JP | 2015026255 A | 2/2015 |
| JP | 6261812 B1 | 1/2018 |
| WO | 2015152304 A1 | 10/2015 |
| WO | 2016139639 A1 | 9/2016 |

OTHER PUBLICATIONS

Office Action issued for counterpart Japanese Application No. 2018-064534, issued by the Japanese Patent Office dated Mar. 10, 2020 (drafted on Mar. 5, 2020).

Office Action issued for counterpart Japanese Application No. 2018-064534, issued by the Japanese Patent Office dated Jun. 16, 2020 (drafted on Jun. 8, 2020).

* cited by examiner

OUTPUT APPARATUS

The contents of the following patent application are incorporated herein by reference:
Japanese Patent Application NO. 2018-064534 filed on Mar. 29, 2018.

BACKGROUND

1. Technical Field

The present invention relates to an output apparatus.

2. Related Art

A technique to generate presentation information indicating that a driver of a first vehicle is not recognizing a second vehicle if it is decided that the driver of the first vehicle is not recognizing the second vehicle is known (see the following Patent Literature 1 or the like, for example).

PRIOR ART LITERATURES

Patent Literatures

[Patent Literature 1] Japanese Patent Application Publication No. 2015-26255
[Patent Literature 2] Japanese Patent Application Publication No. 2015-191583
[Patent Literature 3] Japanese Patent Application Publication No. 2017-126242
[Patent Literature 4] WO 2015/152304
[Patent Literature 5] Japanese Patent Application Publication No. 2003-141690
[Patent Literature 6] Japanese Patent Application Publication No. 2005-165422

It is desired to be able to know that an occupant is not recognized by another vehicle in various traffic situations.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
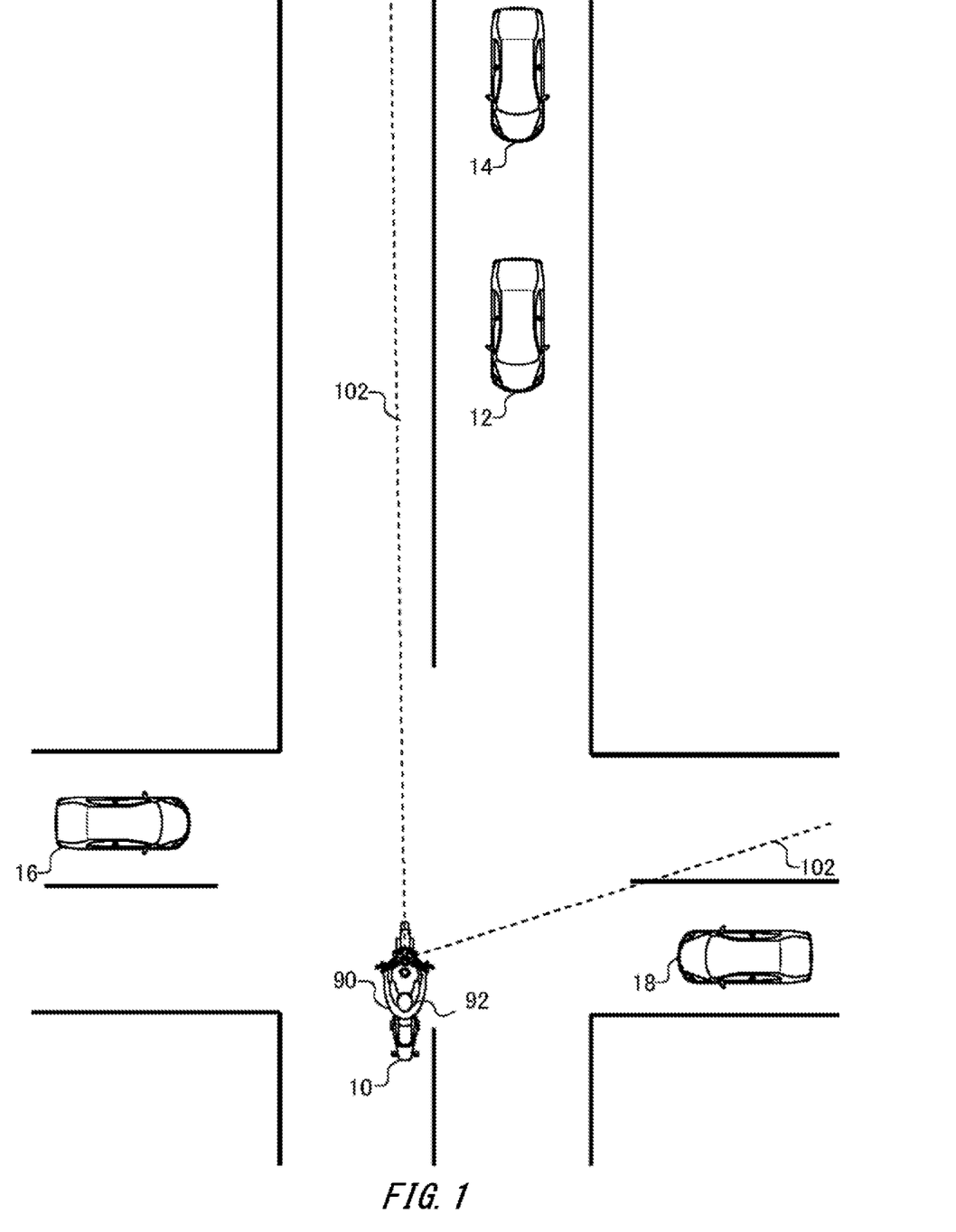
FIG. 1 schematically illustrates a utilization environment of an alert system in a saddle-ride type vehicle 10.

FIG. 1 schematically illustrates a utilization environment of an alert system related to a saddle-ride type vehicle 10. In the present embodiment, the saddle-ride type vehicle 10 is a motorcycle.

FIG. 1 illustrates a situation where the saddle-ride type vehicle 10 is about to turn right at a crossroads. A vehicle 12 and a vehicle 14 are vehicles moving in the opposite direction on the oncoming lane as seen from the saddle-ride type vehicle 10. A vehicle 16 and a vehicle 18 are vehicles that are stopped before the crossroads on a road crossing the road where the saddle-ride type vehicle 10 is present.

In a situation like the one illustrated in FIG. 1, a driver 90 of the saddle-ride type vehicle 10 decides whether or not a driver of the vehicle 12 is recognizing the presence of the saddle-ride type vehicle 10 by looking at the face of the driver of the vehicle 12 in some cases. For example, since, if the driver of the vehicle 12 is looking left, the driver of the vehicle 12 might be not recognizing the presence of the saddle-ride type vehicle 10, the driver 90 can drive the saddle-ride type vehicle 10 while watching out for the behavior of the vehicle 12.

In the present embodiment, the vehicle 12, vehicle 14, vehicle 16, and vehicle 18 are all vehicles with automated driving functions. Note that automated driving is not limited to fully automated driving. Automated driving means various levels of automated driving other than fully automated driving, such as driving assistance or partially automated driving.

If the vehicle 12 has an automated driving function, that an occupant of the vehicle 12 is looking toward the saddle-ride type vehicle 10 does not necessarily suggest that the vehicle 12 is recognizing the saddle-ride type vehicle 10. Accordingly, even if the occupant of the vehicle 12 is looking toward the saddle-ride type vehicle 10, this does not necessarily suggest that the vehicle 12 will take an appropriate action to swerve to avoid the saddle-ride type vehicle 10. On the other hand, even if the occupant of the vehicle 12 is not looking toward the saddle-ride type vehicle 10, the driver 90 cannot know whether or not the vehicle 12 is recognizing the saddle-ride type vehicle 10. Accordingly, if vehicles with automated driving functions become popular, the driver 90 more occasionally and easily feels anxious about whether or not the saddle-ride type vehicle 10 is recognized by other vehicles.

In the present embodiment, the saddle-ride type vehicle 10 inquires vehicles around of whether or not the vehicles around are recognizing the saddle-ride type vehicle 10. If the saddle-ride type vehicle 10 cannot receive recognition information indicating that the saddle-ride type vehicle 10 is recognized, the saddle-ride type vehicle 10 outputs alert information through a display device of the saddle-ride type vehicle 10, or the like. Because of this, the driver 90 of the saddle-ride type vehicle 10 can know that there is a vehicle around that is not recognizing the saddle-ride type vehicle 10.

Here, the region sandwiched by two lines 102 illustrated in FIG. 1 indicates a range of interest of the driver 90 at the crossroads. The range of interest is within a predetermined angular range including the line-of-sight direction of the driver 90. The angular range may be changeable depending on situations or settings. Alert information is displayed on the saddle-ride type vehicle 10 if there is a vehicle from which it does not receive recognition information, among vehicles positioned in the range of interest. Thereby, alert information can be output only about vehicles in the range over which the driver 90 is looking. Because of this, it is possible suppress display of useless alert information.

Note that the angular range of the range of interest may be altered depending on a plurality of factors such as information obtained by a camera mounted on a helmet worn by the driver 90, the state of blinkers of the saddle-ride type vehicle 10, or the direction of the vehicle.

Figure 2:
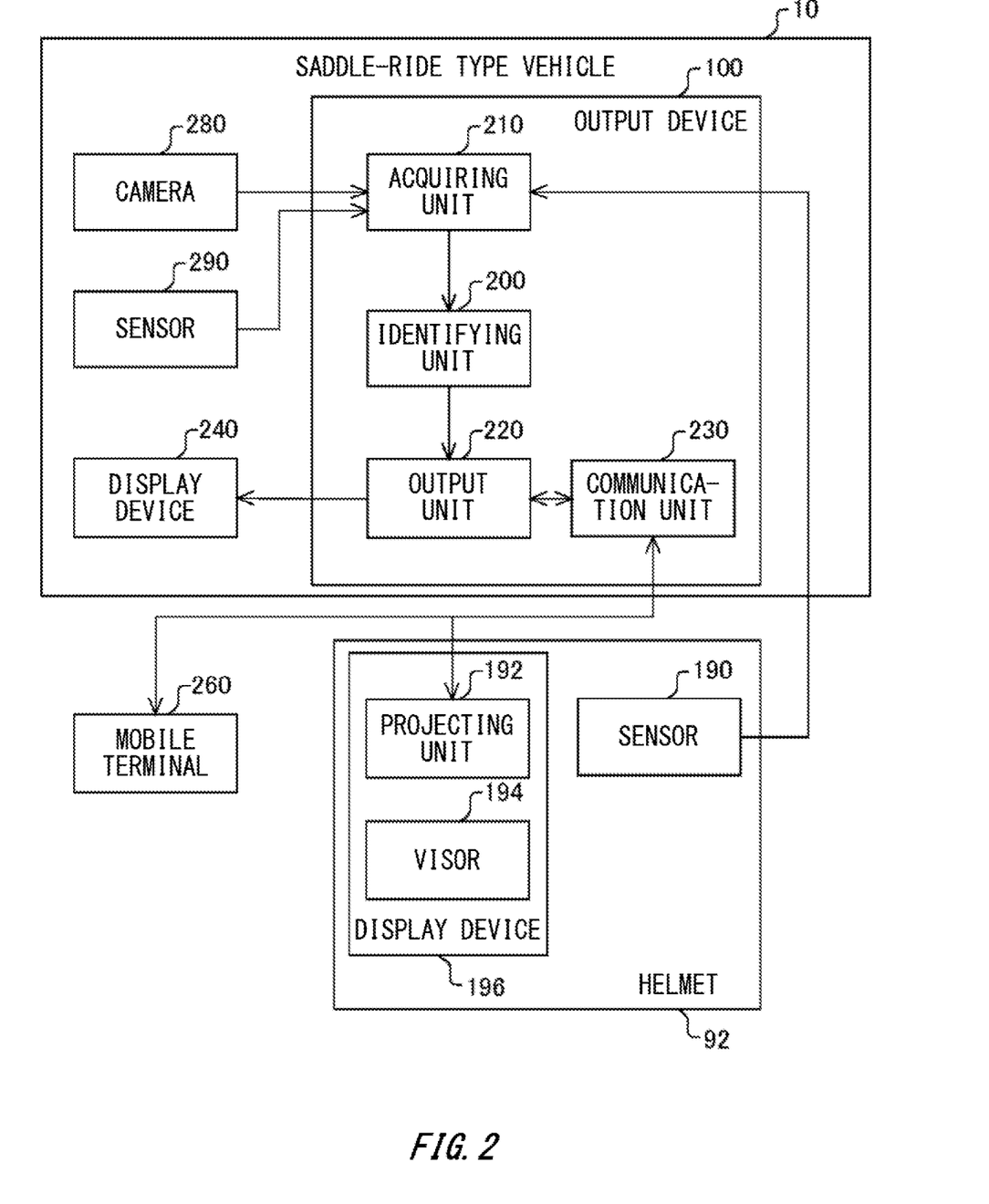
FIG. 2 illustrates the block configuration of a system constituted by the saddle-ride type vehicle 10, a mobile terminal 260, and a helmet 92.

FIG. 2 illustrates the block configuration of an alert system constituted by the saddle-ride type vehicle 10, a mobile terminal 260, and a helmet 92. The saddle-ride type vehicle 10 includes an output apparatus 100, a display device 240, a camera 280, and a position sensor 290. The output apparatus 100 includes an acquiring unit 210, an identifying unit 200, an output unit 220, and a communication unit 230. The helmet 92 includes a sensor 190, and a display device 196. The display device 196 includes a projecting unit 192, and a visor 194. The mobile terminal 260 and display device 196 are exemplary alerting devices attached to the driver 90.

The camera 280 generates captured-image data by capturing an environment around the saddle-ride type vehicle 10. The camera 280 may be attached to a front portion of the saddle-ride type vehicle 10. The sensor 290 includes a sensor to sense the geographic position of the saddle-ride type vehicle 10 based on GPS information or the like, and a distance-measurement sensor that measures distances to other vehicles. The sensor 190 senses the position and orientation of the helmet 92. For example, the sensor 190 is provided at a top portion of the helmet 92, and both left and right-side portions of the helmet 92. The sensor 190 is used as a sensor to sense the position and orientation of the head portion of the driver 90. The orientation of the head portion of the driver 90 can be considered as indicative of the line-of-sight direction of the driver 90. Captured-image data generated by the camera 280, information sensed by the sensor 290, and information sensed by the sensor 190 are supplied to the acquiring unit 210 of the output apparatus 100. The information acquired by the acquiring unit 210 is supplied to the identifying unit 200.

The identifying unit 200 identifies the direction in which the driver 90 is looking. For example, the identifying unit 200 identifies the direction in which the driver 90 is looking, based on information sensed by the sensor 190. For example, the identifying unit 200 may identify the direction in which the driver 90 is looking based on information obtained by a camera attached to the helmet worn by the driver 90 of the saddle-ride type vehicle 10 or the camera 280 attached to a front portion of the saddle-ride type vehicle 10. The communication unit 230 receives, from other vehicles positioned in the direction identified by the identifying unit 200, information indicating whether or not the saddle-ride type vehicle 10 is recognized by those other vehicles. If the saddle-ride type vehicle 10 is not recognized by another vehicle, the output unit 220 outputs alert information to at least one alerting device among alerting devices attached to the saddle-ride type vehicle 10 and the driver 90 of the saddle-ride type vehicle 10.

The output unit 220 outputs alert information if the saddle-ride type vehicle 10 is not recognized by a second vehicle which is another vehicle, and the second vehicle is positioned in a predetermined range including the direction identified by the identifying unit 200. The predetermined range including the direction identified by the identifying unit 200 may be the range of interest explained with reference to FIG. 1 or the like.

The communication unit 230 requests one or more vehicles positioned in the predetermined range including the direction identified by the identifying unit 200 to transmit, to the saddle-ride type vehicle 10, information indicating whether or not the one or more vehicles are recognizing the saddle-ride type vehicle 10. The communication unit 230 is an exemplary receiving unit and requesting unit.

Specifically, the communication unit 230 transmits, to other vehicles, a recognition query inquiring the other vehicles of whether or not they are recognizing the saddle-ride type vehicle 10. The recognition query includes the geographic position of the saddle-ride type vehicle 10, and an address of the saddle-ride type vehicle 10. The communication unit 230 may transmit the recognition query by broadcasting. If the communication unit 230 receives, from other vehicles, recognition information indicating that the other vehicles are recognizing the saddle-ride type vehicle 10, the output unit 220 outputs information indicating that those other vehicles are recognizing the saddle-ride type vehicle 10. Note that the recognition information includes the geographic positions of the other vehicles. Thereby, the positions of the vehicles recognizing the saddle-ride type vehicle 10 can be located.

The output unit 220 may output alert information if the saddle-ride type vehicle 10 is not recognized by the second vehicle, and the second vehicle is moving in such a direction that the second vehicle approaches the saddle-ride type vehicle 10. In addition, the output unit 220 may output alert information if the saddle-ride type vehicle 10 is not recognized by the second vehicle, and the second vehicle is positioned at the start of a line of vehicles. Thereby, output of useless alert information is suppressed.

The output unit 220 outputs alert information if the saddle-ride type vehicle 10 is not recognized by the second vehicle, and the distance between the saddle-ride type vehicle 10 and the second vehicle is shorter than any of the distances between the saddle-ride type vehicle 10 and other vehicles excluding the second vehicle. Thereby, alert information targeted at the vehicle closest to the saddle-ride type vehicle 10 is output. Thereby, output of alert information with relatively lower priorities is suppressed.

The alerting device may be at least one of a display device provided on the saddle-ride type vehicle 10 and a display device attached to the driver 90. Examples of the display device provided on the saddle-ride type vehicle 10 include the display device 240. The display device 240 may be formed by a wind screen and a projecting apparatus, for example. A display device of a navigation apparatus mounted on or built in the saddle-ride type vehicle 10 may be used as the display device 240. A display device in an instrument panel of the saddle-ride type vehicle 10 may be used as the display device 240.

Examples of the display device attached to the driver 90 include the display device 196 formed by the projecting unit 192 and visor 194, a head mounted display attached to the helmet 92 worn by the driver 90, and the like. In this manner, the alerting device may be the display device attached to the helmet 92 worn by the driver 90 of the saddle-ride type vehicle. The display device attached to the driver 90 may be a display device provided on the mobile terminal 260.

If the saddle-ride type vehicle 10 is not recognized by the second vehicle, the output unit 220 displays alert information indicating that the saddle-ride type vehicle 10 is not recognized by the second vehicle, the information being displayed at a position corresponding to the position of the second vehicle in at least one of the field of view of the driver 90, an image representing a map, and an image obtained by capturing an environment around the saddle-ride type vehicle 10. The image obtained by capturing an environment around the saddle-ride type vehicle 10 may be a moving image captured by the camera 280. The moving image captured by the camera 280 may be displayed on the mobile terminal 260, a head mounted display or the like along with alert information.

If the saddle-ride type vehicle 10 is not recognized by the second vehicle, the output unit 220 displays alert information in a predetermined color indicating that the saddle-ride type vehicle 10 is not recognized by the second vehicle, the information being displayed at a position corresponding to the position of the second vehicle in at least one of the field of view of the driver 90, and an image obtained by capturing an environment around the saddle-ride type vehicle 10. The predetermined color indicating that the saddle-ride type vehicle 10 is not recognized may be red, for example. In addition, if recognition information is received from the second vehicle, the output unit 220 may display alert information in a predetermined color indicating that the saddle-ride type vehicle 10 is recognized by the second vehicle at the position of the second vehicle. The predetermined color indicating that the saddle-ride type vehicle 10 is recognized may be blue, for example. This makes it easier to make a distinction since display colors of vehicles are different depending on whether or not they are recognizing the saddle-ride type vehicle 10.

Note that if each vehicle has not been able to recognize, by means of image recognition, the presence of a vehicle at a geographic position included in a recognition query from the saddle-ride type vehicle 10, the vehicle may transmit, to the saddle-ride type vehicle 10, non-recognition information indicating that it has not been able to recognize the saddle-ride type vehicle 10. The non-recognition information may include the geographic position of each vehicle.

Figure 3:
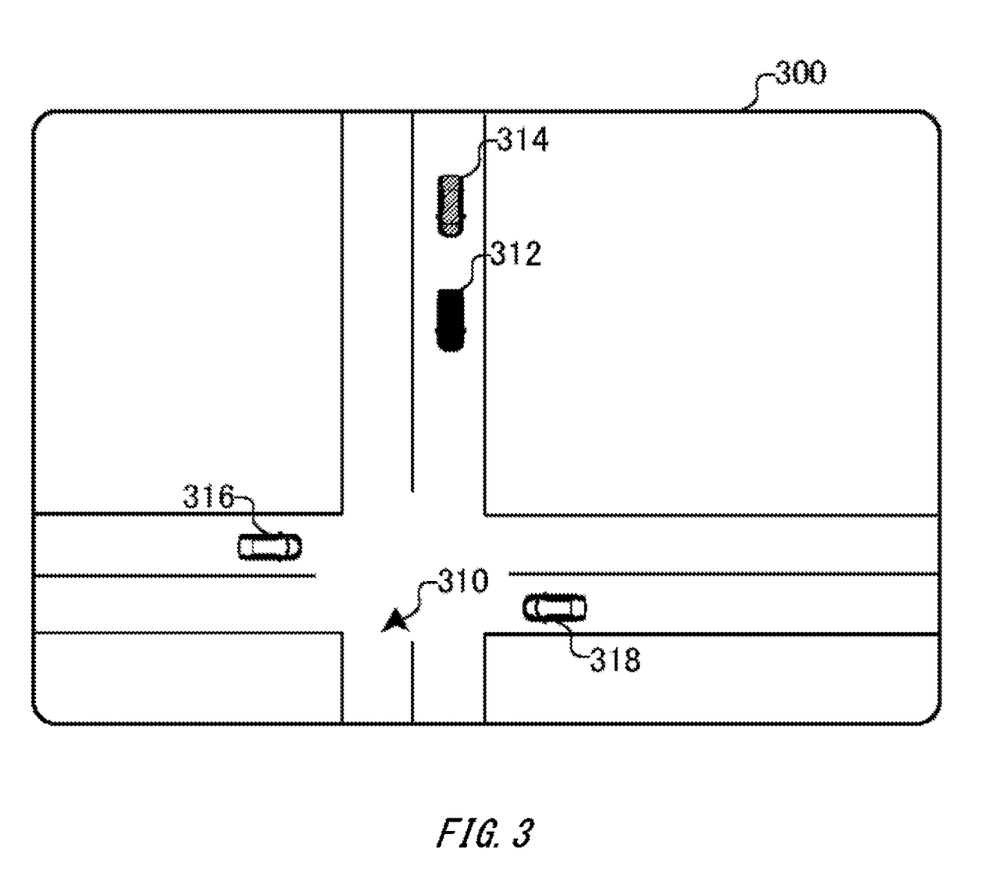
FIG. 3 illustrates an exemplary navigation screen 300.

FIG. 3 illustrates an exemplary navigation screen 300. The navigation screen 300 may be a screen displayed on a navigation apparatus mounted on or built in the saddle-ride type vehicle 10, or the mobile terminal 260 of the driver 90.

On the navigation screen 300, a mark 310 indicating the geographic position of the saddle-ride type vehicle 10 is displayed. On the navigation screen 300, a mark 312, a mark 314, a mark 316, and a mark 318 are displayed at positions corresponding to the geographic positions of the vehicle 12, vehicle 14, vehicle 16, and vehicle 18, respectively. The geographic positions of the vehicle 12, vehicle 14, vehicle 16, and vehicle 18 may be calculated based on captured-image data obtained by the camera 280, distance-measurement information sensed by the sensor 290, and the geographic position of the saddle-ride type vehicle 10. The geographic positions of the vehicle 12, vehicle 14, vehicle 16, and vehicle 18 may be received directly or indirectly from the individual vehicles through communication.

If the communication unit 230 cannot receive recognition information from the vehicle 12, the output unit 220 displays the mark 312 in red to thereby alert the driver 90, noticing that the vehicle 12 is not recognizing the saddle-ride type vehicle 10. Here, since the vehicle 16 and vehicle 18 are not positioned in the region of interest of the driver 90, the mark 316 and mark 318 are displayed in a normal color, irrespective of whether or not the communication unit 230 receives recognition information from the vehicle 16 and vehicle 18. Since vehicles in a range to which the driver 90 is not paying attention are displayed in a normal color, the driver 90 easily understands whether or not a vehicle to which the driver 90 is paying attention is recognizing the saddle-ride type vehicle 10 at a glance.

If the communication unit 230 receives recognition information from the vehicle 14, the output unit 220 displays the mark 314 in blue. Thereby, the driver 90 can decide whether or not vehicles positioned in a region of interest are recognizing the saddle-ride type vehicle 10. Note that the above-mentioned normal color is a color different from red and blue.

Note that the vehicle 14 is not a leading vehicle of a line of vehicles including the vehicle 12 and vehicle 14. Because of this, in another manner of display, the output unit 220 may display the mark 314 in a normal color irrespective of whether or not the communication unit 230 receives recognition information from the vehicle 14.

It is in many cases important to the driver 90 whether or not a leading vehicle of a line of vehicles is recognizing the saddle-ride type vehicle 10. In addition, following vehicles in a line of vehicles heading toward the saddle-ride type vehicle 10 are likely not able to recognize the saddle-ride type vehicle 10 since their fields of view are blocked by vehicles in front of them. By the output unit 220 treating a vehicle at the start of a line of vehicles as the target of display of the recognition state, it is possible to suppress display of an unnecessarily large number of red or blue marks on the navigation screen 300.

Figure 4:
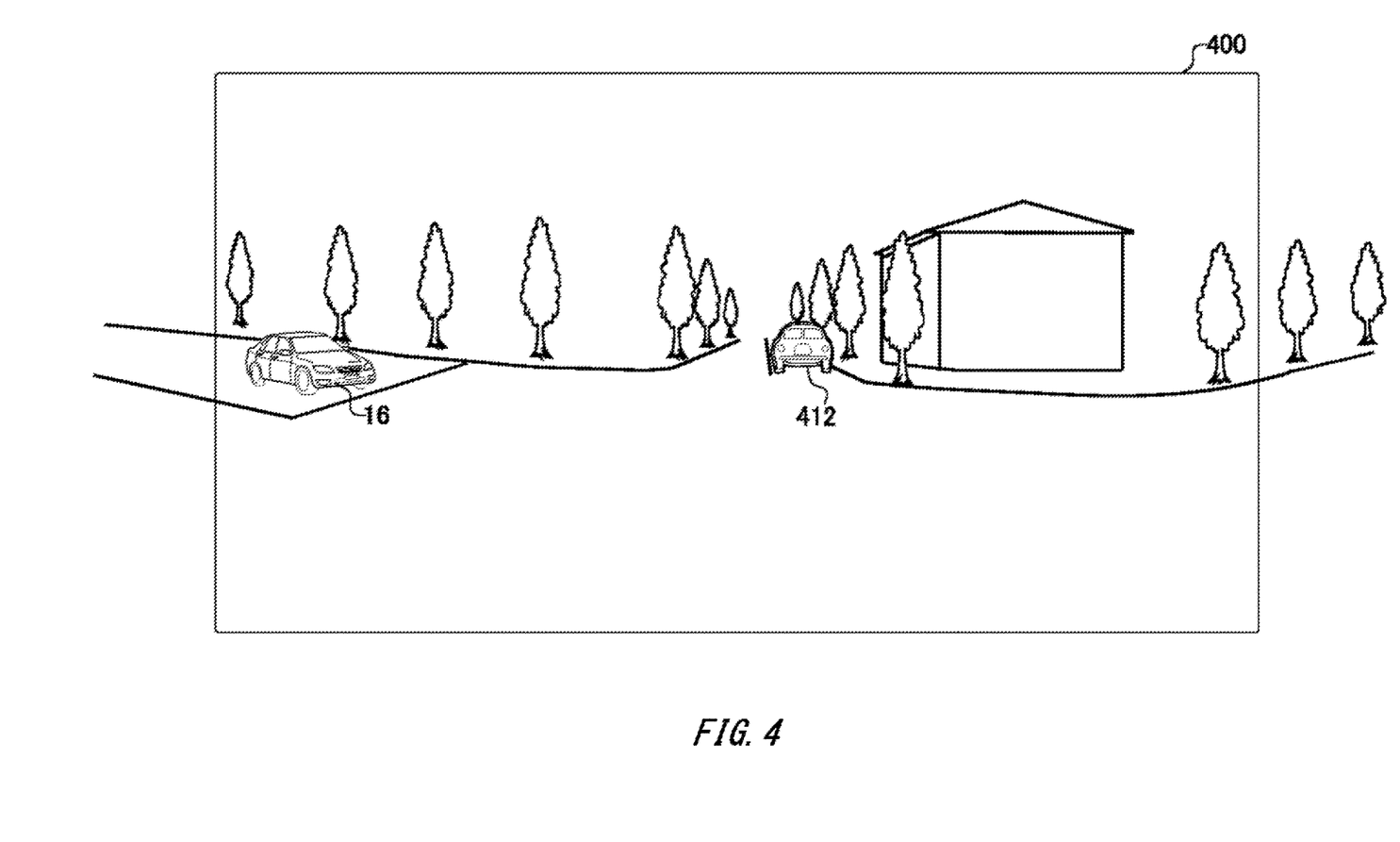
FIG. 4 schematically illustrates a display example of alert information displayed on a visor 194 of the helmet 92.

FIG. 4 schematically illustrates a display example of alert information displayed on the visor 194 of the helmet 92. The projecting unit 192 can project information onto a predetermined area 400 of the visor 194.

The projecting unit 192 projects a mark 412 matching the outline of the vehicle 12 in the area 400. The mark 412 is displayed in red so as to indicate that the vehicle 12 is a vehicle not recognizing the saddle-ride type vehicle 10. The position of the outline of the vehicle 12 in the area 400 is calculated based on the geographic position of the vehicle 12, the geographic position of the helmet 92, the orientation of the helmet 92, an image-capturing range of the camera 280, and an image captured by the camera 280.

Since the vehicle 16 is not present in the region of interest of the driver 90, a mark indicating whether or not the vehicle 16 is recognizing the saddle-ride type vehicle 10 is not projected onto a coordinate corresponding to the geographic position of the vehicle 16.

Note that, in addition to the vehicle 12, the vehicle 14 is present in the range of interest of the saddle-ride type vehicle 10. If recognition information from the vehicle 14 is received, the output unit 220 may display the red mark 412 and the blue mark, placing one of them on the other.

In addition, the output unit 220 may display a mark in a weighted mixture of red and blue, the weighting being determined according to the number of vehicles from which the saddle-ride type vehicle 10 cannot receive recognition information and the number of vehicles from which the saddle-ride type vehicle 10 can receive recognition information. The output unit 220 may display a mark in a weighted mixture of red and blue, the weighting being determined according to distances from the saddle-ride type vehicle 10. In addition, instead of displaying as marks, the output unit 220 may display the entire area 400 or a partial region of the area 400 in a mixture of blue and red.

Note that display contents similar to the display example illustrated in FIG. 4 can also be realized by projecting the display contents onto a wind screen of the saddle-ride type vehicle 10. If the wind screen of the saddle-ride type vehicle 10 is small, it is impossible in some cases to project a mark onto the position of the vehicle 12. Accordingly, the visibility can be appropriately attained by making projected images transparent, and making real objects and marks placed ones of them on the others. In such a case, a method of displaying a wind screen in a mixture of red and blue as in the above-mentioned manner may be employed.

Figure 5:
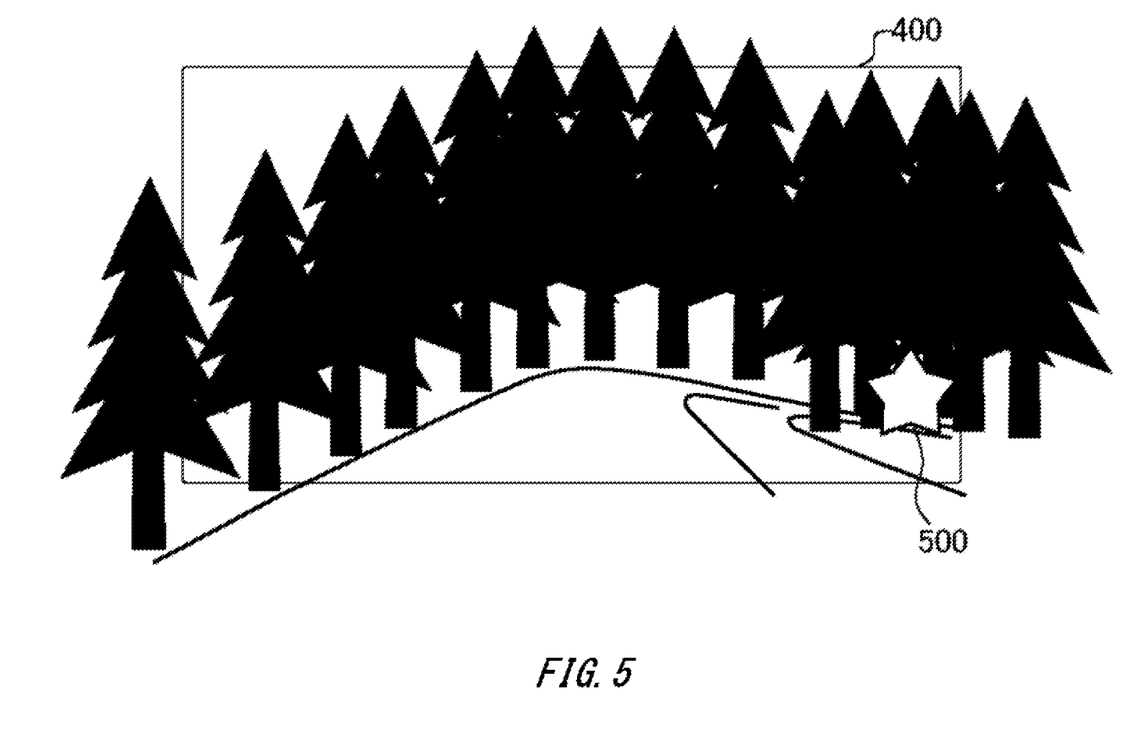
FIG. 5 schematically illustrates another display example of alert information displayed on the visor 194 of the helmet 92.

FIG. 5 schematically illustrates another display example of alert information displayed on the visor 194 of the helmet 92. FIG. 5 illustrates a display method in the case where the driver 90 of the saddle-ride type vehicle 10 is not recognizing other vehicles.

The communication unit 230 broadcasts a recognition query including positional information indicating the geographic position of the saddle-ride type vehicle 10. If, in response to the recognition query, recognition information indicating that it is recognized there is a vehicle at the geographic position indicated by the positional information included in the recognition query is received from other vehicles, the output unit 220 displays a blue mark 500 at a coordinate in the area 400 of the visor 194 and corresponding to the geographic position included in the recognition information. Thereby, the driver 90 can be notified that another vehicle positioned at a location that cannot be seen from the driver 90 is recognizing the saddle-ride type vehicle 10. Such a display method is effective in situations that may occur on mountain paths, for example, and where oncoming cars are hard to see since there are many curves.

Figure 6:
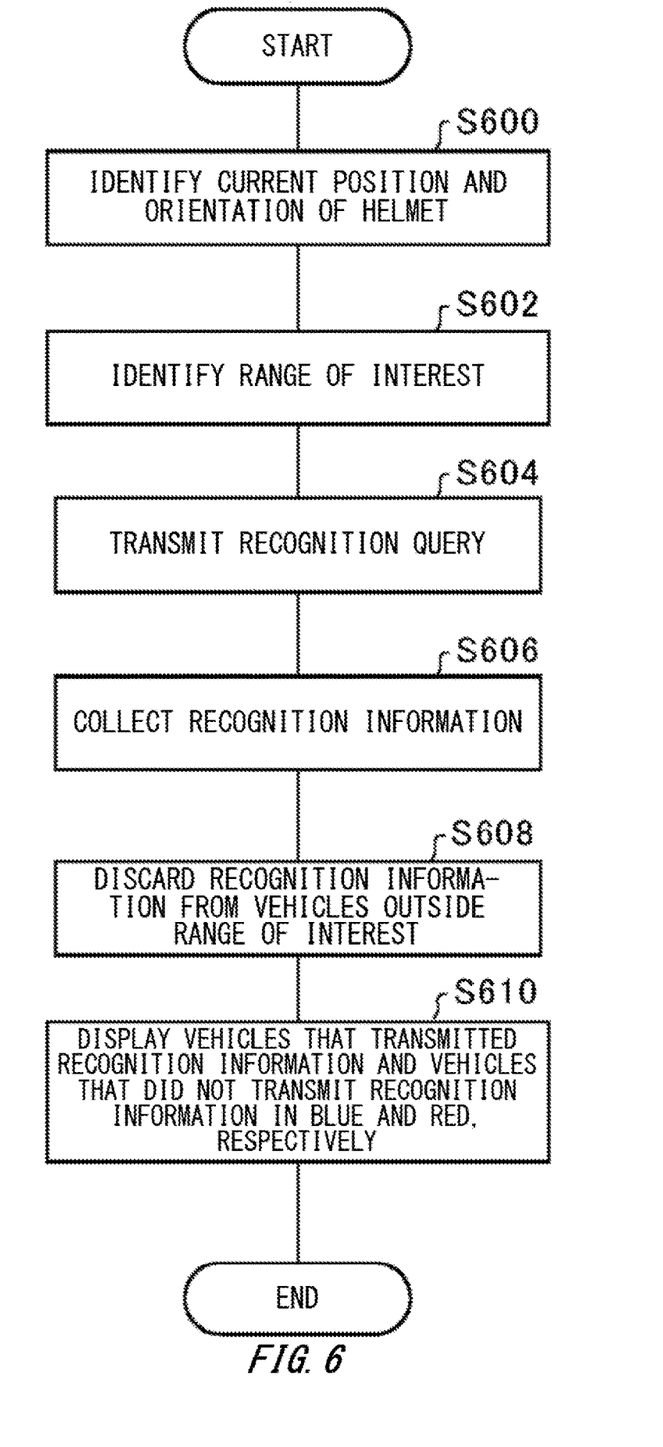
FIG. 6 illustrates an exemplary flowchart illustrating processes performed at an output apparatus 100.

FIG. 6 illustrates an exemplary flowchart illustrating processes performed at the output apparatus 100. The processes of the flowchart illustrated in FIG. 6 are executed at timing to collect information indicating whether or not other vehicles are recognizing the saddle-ride type vehicle 10. The processes of the flowchart illustrated in FIG. 6 may be executed periodically, or may be executed at timing instructed by the driver 90.

At S600, the identifying unit 200 identifies the geographic position and orientation of the helmet 92 based on information sensed by the sensor 190. At S602, the identifying unit 200 identifies a range of interest of the driver 90. For example, a range within a predetermined angular range from the orientation of the helmet 92 may be identified as the range of interest.

At S604, the communication unit 230 transmits a recognition query by broadcasting. The recognition query includes the geographic position of the saddle-ride type vehicle 10, and an address of the saddle-ride type vehicle 10.

At S606, the communication unit 230 collects recognition information transmitted from other vehicles responding to the broadcasting. At S608, based on the geographic positions of the other vehicles included in the recognition information, the output unit 220 discards recognition information from vehicles outside the range of interest identified at S602.

At S610, treating vehicles in the range of interest identified at S602 as targets, the output unit 220 displays vehicles that transmitted recognition information and vehicles that did not transmit recognition information in blue and red, respectively. Manners of display that can be applied include the manners of display that are explained with reference to FIG. 3 or FIG. 4, or the like.

In the examples explained above, mainly, alert information is displayed, treating vehicles in the range of interest identified based on the line of sight of the driver 90 as targets. The size of the range of interest may be a size that can include a plurality of vehicles, but may be a size that includes only a particular vehicle designated by the driver 90. If a range of interest with a size including only a particular vehicle is used, the identifying unit 200 may identify, as the range of interest, a range covered by a single vehicle positioned in the line-of-sight direction of the driver 90. By turning the face to a particular vehicle, the driver 90 can select the vehicle as a single vehicle in the range of interest. In this case, if recognition information could be received from the single vehicle, display in blue may be performed, and if recognition information could not be received, display in red may be performed. With this manner of control, the driver 90 can check whether each vehicle is recognizing the saddle-ride type vehicle 10 vehicle-by-vehicle, selecting each one of vehicles. In addition, since it is possible to check whether or not each vehicle is recognizing the saddle-ride type vehicle 10 vehicle-by-vehicle, alert information can be displayed on a small display device. For example, a lamp provided in an instrument panel of the saddle-ride type vehicle 10 or the like can display alert information.

In the explanation above, it is supposed that all the vehicle 12, vehicle 14, vehicle 16, and vehicle 18 are vehicles with automated driving functions, for the purpose of explaining one embodiment of the invention in an easy-to-understand manner. Recognition information is not transmitted from vehicles without automated driving functions. In addition, if a vehicle does not have a function to respond to a recognition query although it has an automated driving function, such a vehicle does not transmit recognition information. The output apparatus 100 may treat a vehicle that does not transmit recognition information as a vehicle not recognizing the saddle-ride type vehicle 10, and display an alert in red.

In addition, as explained above, by a recognition query being transmitted by broadcasting, and a plurality of vehicles transmitting recognition information including their respective geographic positions, the saddle-ride type vehicle 10 can locate the positions of vehicles recognizing the saddle-ride type vehicle 10. In another method by which the position of a vehicle recognizing the saddle-ride type vehicle 10 is located, a communication method that involves directionality may be used to transmit a recognition query, limiting targets to those in a particular region of interest. For example, the communication unit 230 may transmit a recognition query by communication using directional light or electromagnetic waves. In this case, vehicles that can send back recognition information are limited to vehicles in a region of interest. Because of this, even if a geographic position is not included in recognition information from each vehicle, the output apparatus 100 can decide a vehicle positioned in the region of interest is recognizing the saddle-ride type vehicle 10. Accordingly, if recognition information could not be received, an alert displayed in red can alert the driver 90. In addition, if there is a plurality of vehicles in the region of interest, and one or more pieces of recognition information are received, the output unit 220 may display the number of received pieces of recognition information. Thereby, the driver 90 can surmise whether or not there is a vehicle not recognizing the saddle-ride type vehicle 10.

As explained above, alert information may be output as colors, figures such as marks, characters such as numbers that are displayed on a wind screen, a display device or the like. Alert information may be not only displayed, but also output as sounds.

In addition, at least some processes of the processes explained above can be applied not only to situations at crossroads, mountain paths, or the like, but also to various traffic situations. For example, they can be applied to situations where an alert is issued to notice that a vehicle that the saddle-ride type vehicle 10 is about to pass on a freeway or the like is not recognizing the saddle-ride type vehicle 10, or where a vehicle that is about to pass the saddle-ride type vehicle 10 is not recognizing the saddle-ride type vehicle 10.

Note that the saddle-ride type vehicle may be any type of vehicle in general that occupants ride astride when they travel with it. The saddle-ride type vehicle may not only be a two wheel vehicle such as a motorcycle or a motorized bicycle, but also be a three wheel vehicle such as a trike, or a four wheel vehicle. The three wheel vehicle may be a front single-wheel, and rear double-wheel vehicle or a front double-wheel, and rear single-wheel vehicle. Note that the two wheel vehicle may be a scooter type two wheel vehicle having one or more floor steps at a front portion thereof.

In addition, at least some processes of the above-mentioned processes can be applied to vehicles other than saddle-ride type vehicles. For example, a four-wheeled car may broadcast a recognition query from itself, and the presence of other vehicles from which the four-wheel vehicles cannot receive recognition information can be displayed on a navigation screen like the one illustrated in FIG. 3.

Figure 7:
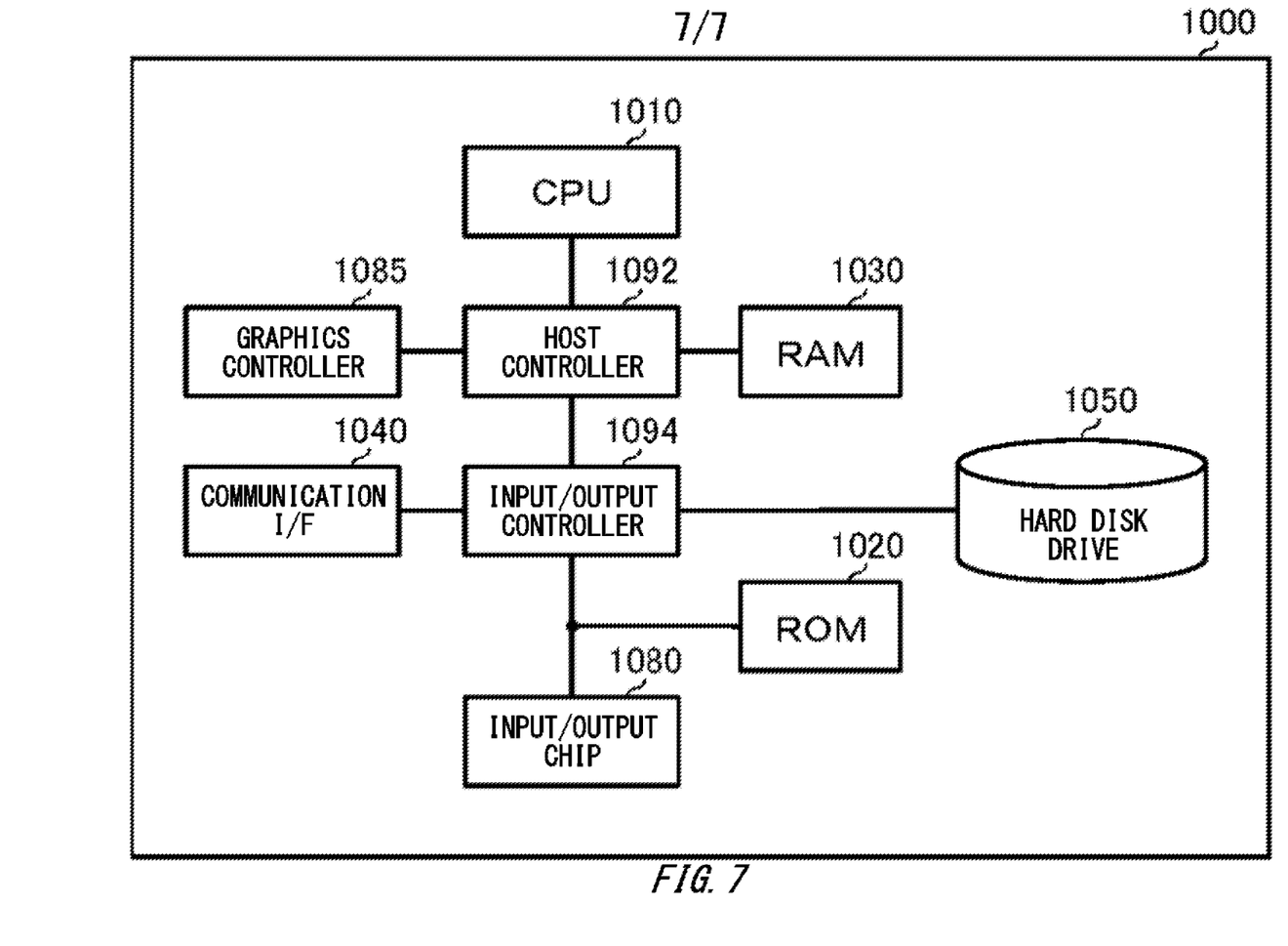
FIG. 7 schematically illustrates an exemplary computer 1000 to function as the output apparatus 100.

FIG. 7 schematically illustrates an exemplary computer 1000 to function as the output apparatus 100. The computer 1000 according to the present embodiment includes: a CPU peripheral unit having a CPU 1010, a RAM 1030, and a graphics controller 1085 that are interconnected by a host controller 1092; and an input/output unit having a ROM 1020, a communication I/F 1040, a hard disk drive 1050, and an input/output chip 1080 that are connected to the host controller 1092 by an input/output controller 1094.

The CPU 1010 performs operations based on programs stored on the ROM 1020 and RAM 1030, and performs control of each unit. The graphics controller 1085 acquires image data generated by the CPU 1010 or the like on a frame buffer provided in the RAM 1030, and displays the image data on a display. Instead of this, the graphics controller 1085 may include therein a frame buffer to store image data generated by the CPU 1010 or the like.

The communication I/F 1040 communicates with another device via a network through a wired or wireless connection. In addition, the communication I/F 1040 functions as hardware to perform communication. The hard disk drive 1050 stores programs and data to be used by the CPU 1010.

The ROM 1020 stores a boot-program to be executed by the computer 1000 at the time of activation and programs or the like that depend on hardware of the computer 1000. The input/output chip 1080 connects various types of input/output devices to the input/output controller 1094 via, for example, a parallel port, a serial port, a keyboard port, a mouse port, and the like.

Programs to be provided on the hard disk drive 1050 via the RAM 1030 are provided by a user in the form stored on a recording medium such as an IC card. The programs are read out from the recording medium, installed on the hard disk drive 1050 via the RAM 1030, and executed at the CPU 1010.

The programs that are installed on the computer 1000, and make the computer 1000 function as the output apparatus 100 may act on the CPU 1010 or the like to make the computer 1000 function as each unit of the output apparatus 100. Information processing described in these programs are read in by the computer 1000 to thereby make the computer 1000 function as the acquiring unit 210, identifying unit 200, communication unit 230, and output unit 220, which are specific means attained by cooperation between software and various types of hardware resources mentioned above. With these specific means, the unique output apparatus 100 corresponding to a purpose of use of the computer 1000 in the present embodiment can be constructed by realizing operations on or processing of information corresponding to the purpose of use.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCE SYMBOLS

10: saddle-ride type vehicle;
12: vehicle;
14: vehicle;
16: vehicle;
18: vehicle;
90: driver;
100: output apparatus;
102: line;
92: helmet;
100: output apparatus;
190: sensor;
192: projecting unit;
194: visor;
196: display device;
200: identifying unit;
220: output unit;
230: communication unit;
240: display device;
260: mobile terminal;
280: camera;
300: navigation screen;
310: mark;
312: mark;
314: mark;
316: mark;
318: mark;
400: area;
412: mark;
500: mark;
1000: computer;
1010: CPU;
1020: ROM;
1030: RAM;
1040: communication I/F;
1050: hard disk drive;
1080: input/output chip;
1085: graphics controller;
1092: host controller;
1094: input/output controller

What is claimed is:

1. An output apparatus comprising:
    an identifying unit configured to identify a direction in which an occupant of a first vehicle is looking, based on a position and an orientation of a head of the occupant sensed by a sensor;
    a requesting unit configured to transmit, in a direction identified by the identifying unit, a query inquiring whether or not the first vehicle is recognized, by using a communication method that involves directionality;

a receiving unit configured to receive, from one or more vehicles positioned in a direction the query was transmitted, recognition information indicating that the one or more vehicles are recognizing the first vehicle; and an output unit configured to output alert information to at least one alerting device among alerting devices attached to the first vehicle and the occupant if the receiving unit does not receive the recognition information and a second vehicle is positioned in the direction identified by the identifying unit within a predetermined range.

2. The output apparatus according to claim 1, wherein the output unit outputs the alert information if the receiving unit does not receive the recognition information and the second vehicle positioned in the direction identified by the identifying unit is moving in such a direction that the second vehicle approaches the first vehicle.

3. The output apparatus according to claim 1, wherein the output unit outputs the alert information if the receiving unit does not receive the recognition information and the second vehicle positioned in a direction identified by the identifying unit is positioned at a start of a line of vehicles.

4. The output apparatus according to claim 1, wherein the output unit outputs the alert information if the receiving unit does not receive the recognition information, and a distance between the first vehicle and the second vehicle positioned in a direction identified by the identifying unit is shorter than any of distances between the first vehicle and other vehicles excluding the second vehicle.

5. The output apparatus according to claim 1, wherein
the at least one alerting device is at least one of a display device provided on the first vehicle and a display device attached to the occupant, and
if the receiving unit does not receive the recognition information, the output unit displays information indicating that the first vehicle is not recognized by the second vehicle, the information being displayed at a position corresponding to a position of the second vehicle positioned in a direction identified by the identifying unit in at least one of a field of view of the occupant, an image representing a map, and an image obtained by capturing an environment around the first vehicle.

6. The output apparatus according to claim 1, wherein if the receiving unit does not receive the recognition information, the output unit displays information in a predetermined color indicating that the first vehicle is not recognized, the predetermined color being displayed at a position of the second vehicle positioned in a direction identified by the identifying unit in at least one of a field of view of the occupant, and an image obtained by capturing an environment around the first vehicle.

7. The output apparatus according to claim 6, wherein the alerting device is a display device attached to the occupant.

8. The output apparatus according to claim 1, wherein the first vehicle is a saddle-ride type vehicle.

9. The output apparatus according to claim 8, wherein the at least one alerting device is a display device attached to a helmet worn by the occupant of the saddle-ride type vehicle.

10. The output apparatus according to claim 8, wherein the identifying unit identifies the direction in which the occupant is looking based on information obtained by a camera attached to a helmet worn by the occupant of the saddle-ride type vehicle or to a front portion of the saddle-ride type vehicle.

11. The output apparatus according to claim 8, wherein
the alerting device is a display device that displays an object on a visor of a helmet worn by the occupant of the saddle-ride type vehicle or on a wind screen attached to the saddle-ride type vehicle; and
if the receiving unit does not receive the recognition information, the output unit causes the visor worn by the occupant of the saddle-ride type vehicle or the wind screen attached to the saddle-ride type vehicle to display a predetermined mark such that the mark is placed on a position at which the second vehicle positioned in a direction identified by the identifying unit is visually recognized by the occupant of the first vehicle.

* * * * *